Figure 1:
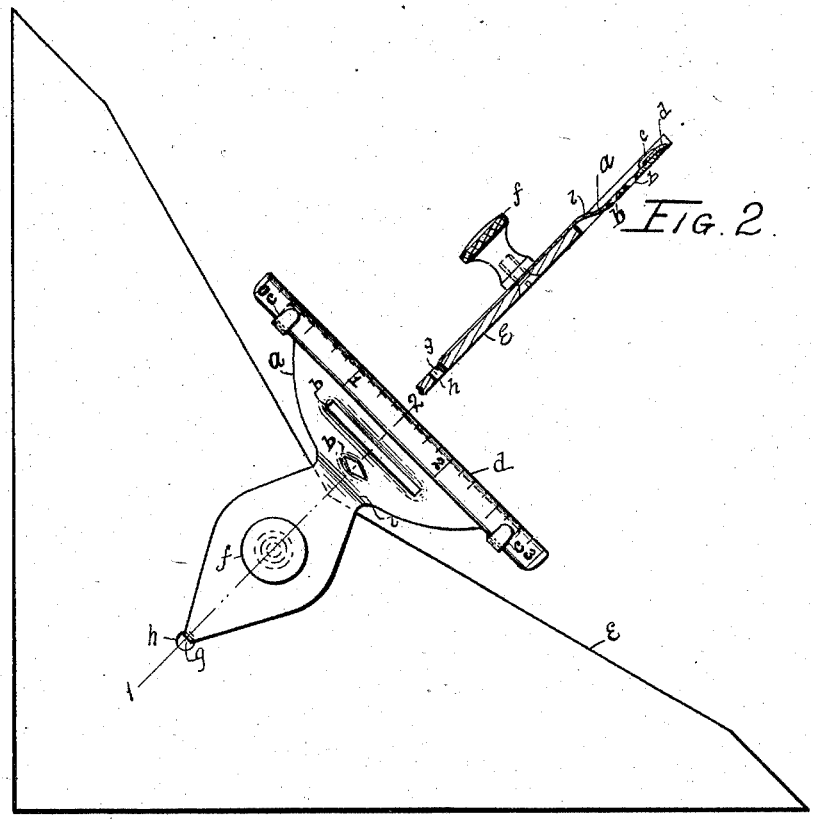

D. J. KELSEY.
DRAFTING INSTRUMENT.
APPLICATION FILED DEC. 14, 1908.

966,924.

Patented Aug. 9, 1910.

WITNESSES:
A. Beverly Stevens
Frank Minier

INVENTOR.
Duane J. Kelsey

UNITED STATES PATENT OFFICE.

DUANE J. KELSEY, OF NEW HAVEN, CONNECTICUT.

DRAFTING INSTRUMENT.

966,924.  Specification of Letters Patent.  Patented Aug. 9, 1910.

Application filed December 14, 1908.  Serial No. 467,568.

*To all whom it may concern:*

Be it known that I, DUANE J. KELSEY, a citizen of the United States, residing at New Haven, in the county of New Haven and State of Connecticut, have invented a new and useful Drafting Instrument, of which the following is a specification.

My invention relates to improvements in drafting instruments in which an erasing shield is combined with a ruling form and a lineal scale and the object of my invention is to provide an erasing shield, conjoined to a ruling form and a lineal scale in a way to facilitate the operations of erasing, ruling and scaling, by bringing the control of these different instruments under one piece. I attain this object by the device illustrated in the accompanying drawings in which—

Figure 1 is a top view of the instrument and Fig. 2 is a section on the line 1, 2, of Fig. 1.

In Fig. 1 the plate $a$ having various depressions with thin edged openings as at $b$, $b$, to admit the action of an eraser, is attached to the ruling form $e$ by means of the knob nut $f$ upon its upper side and a screw from beneath, which serves to clamp together the ruling form $e$ and the erasing plate $a$, the latter being further prevented from turning around by the hooked end $g$ entering a hole in the ruling form $e$ at $h$. The plate $a$ has an offset at $i$ that its under side may lie in approximately the same plane as the lower side of the ruling form $e$. The plate $a$ also has spring clips at $c$ $c$ to receive lineal scales $d$ of various graduations. The clips $c$ $c$ are formed by bending over proper projections on the blank from which the plate $a$ is formed, so as to be slightly yielding to permit the removal and interchange of differently graduated scales. The scales $d$ have the front edge bent down to make accurate measurements more feasible.

Although erasing plates and lineal scales of the general form shown may be attached to ruling forms of various shapes they are particularly adapted to the ruling form shown, in that a compact device of wide application is thus secured, as it supplies an erasing plate, a scale and a ruling form that gives ruling edges at all the slopes of both the 45° and 60° triangles commonly used by draftsmen and at the same time permits easy control of all by a knob.

I am aware that prior to my invention erasing grooves and lineal scales have each been used in connection with ruling forms. I therefore do not claim such a combination broadly.

I claim—

1. The combination with a ruling form of a shield mounted on said form and a lineal scale detachably secured to the outer edge of said shield.

2. The combination with a ruling form of an erasing shield mounted on said form and projecting beyond one edge thereof, said shield provided with a thin edged opening and with clips at its outer edge and a lineal scale engaged by said clips.

DUANE J. KELSEY.

Witnesses:
A. BEVERLY STEVENS,
FRANK MINER.